United States Patent
Lammer et al.

(10) Patent No.: US 10,935,320 B2
(45) Date of Patent: Mar. 2, 2021

(54) METHOD FOR DETERMINING THE STATE OF A REFRACTORY LINING OF A METALLURGICAL VESSEL FOR MOLTEN METAL IN PARTICULAR

(71) Applicant: Refractory Intellectual Property GmbH & Co. KG, Vienna (AT)

(72) Inventors: Gregor Lammer, Vienna (AT); Christoph Jandl, Linz (AT); Karl-Michael Zettl, Vienna (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 253 days.

(21) Appl. No.: 16/002,419

(22) Filed: Jun. 7, 2018

(65) Prior Publication Data
US 2018/0347907 A1    Dec. 6, 2018

Related U.S. Application Data

(63) Continuation-in-part of application No. 14/777,810, filed as application No. PCT/EP2014/054474 on Mar. 7, 2014, now abandoned.

(30) Foreign Application Priority Data

Apr. 12, 2013    (EP) .................................. 13163565

(51) Int. Cl.
*F27D 21/00*    (2006.01)
*F27D 1/16*    (2006.01)
(Continued)

(52) U.S. Cl.
CPC .......... *F27D 21/0021* (2013.01); *C21C 5/445* (2013.01); *F27D 1/1642* (2013.01);
(Continued)

(58) Field of Classification Search
CPC .......... C21C 2005/448; C21C 2300/06; C21C 5/445; F27D 1/1642; F27D 1/1678;
(Continued)

(56) References Cited

U.S. PATENT DOCUMENTS

| 4,227,802 A | 10/1980 | Scholdstrom et al. |
| 4,913,324 A | 4/1990 | Luhrsen et al. |

(Continued)

FOREIGN PATENT DOCUMENTS

| EP | 0632291 A2 | 1/1995 |
| EP | 1310573 A2 | 11/2002 |

(Continued)

OTHER PUBLICATIONS

Abstract of EP 1310573 A2.
(Continued)

*Primary Examiner* — Scott R Kastler
*Assistant Examiner* — Michael Aboagye
(74) *Attorney, Agent, or Firm* — Brian Roffe

(57) ABSTRACT

Method for determining the state of a fire-resistant lining of a vessel containing molten metal in particular in which maintenance data, production data, and wall thicknesses at least at locations with the highest degree of wear are measured or ascertained together with additional process parameters of at least one identical/similar vessel after the vessel has been used. The data is collected and stored in a data structure. A calculating model is generated from at least some of the measured or ascertained data or parameters, and the data or parameters are evaluated using the calculating model using calculations and subsequent analyses. Thus, related or integral ascertaining processes and subsequent analyses can be carried out, on the basis of which optimi- (Continued)

zations relating to both the vessel lining as well as the complete process of the molten metal in the vessel are achieved.

19 Claims, 2 Drawing Sheets

(51) Int. Cl.
*C21C 5/44* (2006.01)
*F27D 3/15* (2006.01)
*G01B 11/00* (2006.01)
*G01B 11/06* (2006.01)
*F27D 1/00* (2006.01)
*G01B 21/08* (2006.01)

(52) U.S. Cl.
CPC ......... *F27D 1/1678* (2013.01); *F27D 3/1509* (2013.01); *F27D 21/0014* (2013.01); *G01B 11/005* (2013.01); *G01B 11/06* (2013.01); *C21C 2005/448* (2013.01); *C21C 2300/06* (2013.01); *F27D 2001/0056* (2013.01); *G01B 21/08* (2013.01)

(58) Field of Classification Search
CPC ......... F27D 2001/0056; F27D 21/0014; F27D 21/0021; F27D 3/1509; G01B 11/005; G01B 11/06; G01B 21/08
USPC ....... 266/44, 99, 280, 281, 90, 275, 236, 45, 266/80; 356/630, 614, 625, 602, 601, 356/606, 631, 615–624; 75/375
See application file for complete search history.

(56) References Cited

U.S. PATENT DOCUMENTS

| | | | |
|---|---|---|---|
| 4,949,886 A | 8/1990 | Luhrsen et al. | |
| 5,546,176 A | 8/1996 | Jokinen | |
| 5,890,805 A | 4/1999 | Groth et al. | |
| 5,944,421 A * | 8/1999 | Groth | C21B 7/06 374/166 |
| 5,961,214 A | 10/1999 | Groth et al. | |
| 5,975,754 A * | 11/1999 | Groth | C21B 7/06 374/166 |
| 6,335,945 B1 | 1/2002 | Meierling et al. | |
| 6,938,599 B2 | 1/2005 | Martin et al. | |
| 6,922,252 B2 | 7/2005 | Harvill et al. | |
| 7,149,590 B2 | 12/2006 | Martin et al. | |
| 7,174,787 B2 | 2/2007 | Sadri et al. | |
| 7,268,892 B2 | 9/2007 | Van Den Bossche | |
| 7,458,266 B2 | 12/2008 | Beard et al. | |
| 7,665,362 B2 | 2/2010 | Sadri | |
| 8,002,871 B2 | 8/2011 | Lu et al. | |
| 9,170,050 B2 | 10/2015 | Argenta et al. | |
| 9,546,909 B2 | 1/2017 | Goda | |
| 10,444,079 B2 | 10/2019 | Singh | |
| 10,604,814 B2 | 3/2020 | Lee et al. | |
| 10,633,716 B2 | 4/2020 | Lee et al. | |
| 2002/0071473 A1 | 6/2002 | Stercho | |
| 2002/0110175 A1 | 8/2002 | Stercho | |
| 2004/0108637 A1 | 6/2004 | Abrino et al. | |
| 2005/0089468 A1 | 4/2005 | Wansbrough et al. | |
| 2008/0092658 A1 * | 4/2008 | Sadri | F27D 19/00 73/598 |
| 2008/0093780 A1 | 4/2008 | Ebisawa et al. | |
| 2016/0297003 A1 | 10/2016 | Morikawa et al. | |
| 2016/0298907 A1 | 10/2016 | Lammer et al. | |
| 2017/0261263 A1 | 9/2017 | Bachmayer et al. | |

FOREIGN PATENT DOCUMENTS

| | | |
|---|---|---|
| JP | 2010156471 A | 7/2010 |
| WO | 2003081157 A1 | 10/2003 |
| WO | 20070107242 A1 | 9/2007 |
| WO | 20140166678 A1 | 10/2014 |
| WO | 20140170071 A1 | 10/2014 |

OTHER PUBLICATIONS

Refractory Installation and Maintenance, F.S. Sperry, downloaded Jun. 6, 2018.
Model Based Diagnosis of Ladle Refractory Lining, Emil Mihailov, Venko Petkov, "New Trends in Fatigue and Fracture" (NT2F9), Belgrade, Serbia, Oct. 12-14, 2009.
Abstract of Ladle furnace on-line reckoner for prediction and control of steel temperature and composition, N. K. Nath et al., https://doi.org/10.1179/174328106X80082, downloaded Jun. 6, 2018.

* cited by examiner

METHOD FOR DETERMINING THE STATE OF A REFRACTORY LINING OF A METALLURGICAL VESSEL FOR MOLTEN METAL IN PARTICULAR

FIELD OF THE INVENTION

The invention relates to a method for determining the state of a refractory lining of a metallurgical vessel, preferably a vessel for molten metal, in particular, wherein data about the refractory lining, such as materials, wall thickness, type of installation and others, are detected or measured and evaluated.

BACKGROUND OF THE INVENTION

Calculation methods exist for the construction of the refractory lining in particular of metallurgical vessels for molten metal, wherein ascertained data or empirical values are converted into mathematical models. Since with these mathematical models the effective wear mechanisms for the uses of the metallurgical vessels can not be detected sufficiently accurately or be taken into consideration, the possibilities for mathematically determining the refractory constructions and the maintenance work for the lining are very restricted, i.e., decisions regarding the period of use of the refractory lining of a vessel, for example of a converter, must still be taken manually.

In a method according to publication WO-A-03/081157 for measuring the residual thickness of the refractory lining in the wall and/or base area of a metallurgical vessel, e.g., of an arc furnace, the measured data ascertained are used for the subsequent repair of the areas of wear that have been identified. The measuring unit is brought here on a manipulator serving to repair the lining into a measuring position over or inside the metallurgical vessel and the residual thickness of the lining is then measured in its wall and/or base area. By comparing with a current profile of the lining measured at the start of the furnace campaign, its wear is ascertained, on the basis of which the refractory lining can then be repaired. With this method, however, comprehensive ascertainment of the vessel lining is not possible either.

According to publication WO-A-2007/107242, a method for determining the wall thickness or the wear of the lining of a metallurgical crucible with a scanner system for contactlessly sensing the lining surface with determination of the position and orientation of the scanner system and assignment to the position of the crucible by detecting spatially fixed reference points is disclosed. A perpendicular reference system is used here and the tilts of two axes in relation to a horizontal plane are measured by means of tilt sensors. The data measured by the scanner can be transformed into a perpendicular coordinate system and automated measurement of the respective current state of the lining of the crucible is thus possible.

OBJECTS AND SUMMARY OF THE INVENTION

On the basis of these known calculation methods or measuring methods, it is an object of the present invention to devise a method by means of which the service life of the refractory lining of a metallurgical vessel and the process in its own right can be optimized and manual decisions for this purpose are reduced or practically eliminated.

According to the invention this object is achieved by method for determining the state of a refractory lining of a vessel receivable of molten metal which entails obtaining a first set of data about the vessel, the first set of data including thickness of blocks of the refractory lining and data about materials injected into the refractory lining, and obtaining a second set of data about operational use of the vessel, the second set of data including identity of molten metal operatively received by the vessel, properties of the molten metal operatively received by the vessel including amount, temperature and composition of the molten metal operatively received by the vessel, composition of slag in the vessel and thickness of the slag, tapping times using the vessel, temperature profiles of the molten metal operatively received by the vessel, treatment times of the molten metal operatively received by the vessel, metallurgical parameters of the molten metal operatively received by the vessel, and a manner in which the molten metal is poured or tapped into and out of the vessel. Also, a third of data about the refractory lining after use of the vessel is obtained, the third set of data including thickness of the refractory lining at points of wear. At least a portion of the data in the first, second and third sets of data is obtained by being detected or measured using measuring apparatus. The first, second and third sets of data are stored in a data storage unit. A model is generated from at least a portion of data in the first, second and third sets of data which provides information about use of the refractory lining Based on the generated model and the current state of the refractory lining, a manner for further use of the vessel is determined by considering whether to repair or alter properties of the refractory lining or whether to alter use of the vessel including the refractory lining When a manner for further use of the refractory lining is determined and is different than the current state or use of the refractory lining, the manner for further use of the refractory lining is implemented.

The method according to the invention makes provision such that all of the data of a respective vessel are collected and stored in a data structure, and a calculation model is generated from all of the measured and ascertained data or parameters, by means of which these data or parameters are evaluated by means of calculations and subsequent analyses.

With this method according to the invention, for a metallurgical vessel one can ascertain not only measurements in order to identify the current state of the vessel after it has been used, but related or integral ascertaining processes and subsequent analyses can also be carried out from which optimizations are achieved both in relation to the vessel lining and to the entire process sequence of the molten mass poured into the vessel and treated within the vessel.

Additional advantageous details of this method within the framework of the invention are set forth below.

BRIEF DESCRIPTION OF THE DRAWINGS

Exemplary embodiments as well as additional advantages of the invention are described in more detail below by the drawings, in which.

DETAILED DESCRIPTION OF THE INVENTION

Figure 1:
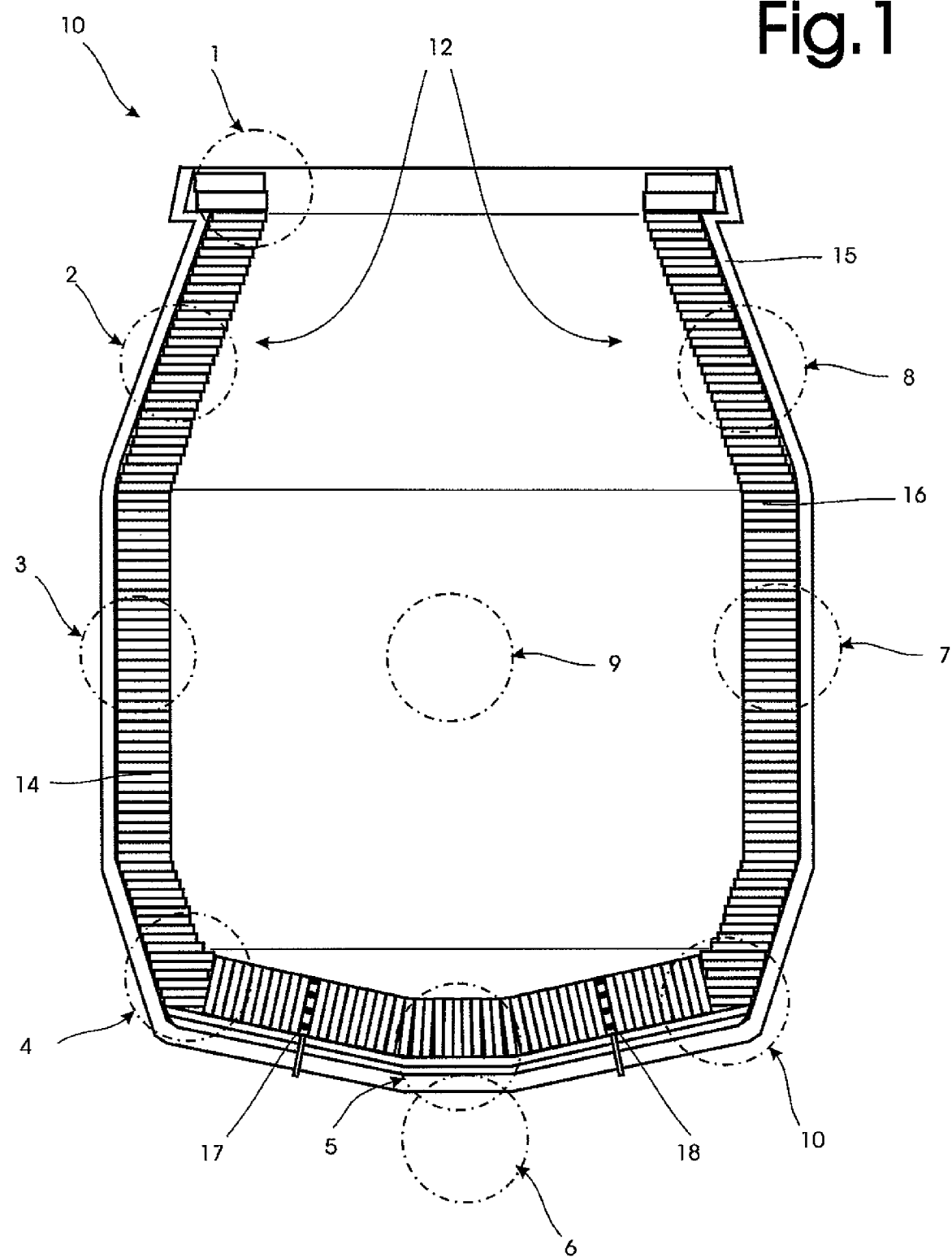
FIG. 1 is a diagrammatic longitudinal section of a metallurgical vessel sub-divided into sectors.

The method relates in particular to metallurgical vessels, one such vessel 10 being shown in section in FIG. 1 as an exemplary embodiment. In this instance, the vessel 10 is a converter, known in its own right, for the production of steel. The vessel 10 consists essentially of a metal housing 15, a refractory lining 12 and gas purging plugs 17, 18 which can be coupled to a gas supply (not detailed).

The molten metal which is poured into this vessel 10 during operation is treated metallurgically, for example by a blowing process which will not be described in any more detail. Generally, a number of these converters 10 are used at the same time in a steel works and data are to be recorded for each of these converters.

Needless to say, the method can be used for different metallurgical vessels, such as for example for electric furnaces, blast furnaces, steel ladles, vessels in the field of non-ferrous metals such as aluminium melting furnaces, copper anode furnaces or the like.

The method is also characterized in that it can likewise be used for different containers. Thus, for example, the refractory linings of all converters and ladles in operation can be determined, wherein the same molten mass is first of all treated in a converter and is then poured into steel ladles.

First of all, all of the data for each vessel 10, sub-divided into groups, are collected and stored in a data structure.

In order to measure the wear as a group of the vessel lining 12 embedded within the metal housing 15, this initially takes place on the new refractory lining which is generally provided with different blocks 14, 16 or wall thicknesses. This can also take place by measuring or by the pre-specified dimensions of the blocks 14, 16 being known. In addition, the materials and material properties of the blocks 14, 16 used and of any injected materials used are recorded.

For the additional group identified as production data, recording takes place during the period of use of the respective vessel 10, such as the amount of molten mass, the temperature, the composition of the molten mass or the slag and its thickness, tapping times, temperature profile, treatment time and/or metallurgical parameters such as particular additions to the molten mass. Depending on the type of vessel, only some or all of the aforementioned production data are recorded.

Furthermore, after using a vessel 10 a measurement of the wall thicknesses of the lining 12 is then taken, at least at the points with the greatest wear, for example at the contact points of the slag when the vessel is full, but preferably of the entire lining 12. It is sufficient here if the wall thicknesses of the lining 12 are measured after a number of tappings.

Other process parameters, such as the manner of pouring or tapping the molten metal into or out of the crucible can then be ascertained.

According to the invention, a calculation model is generated from at least some of the measured and ascertained data or parameters, by means of which these data or parameters are evaluated by calculations and subsequent analyses.

By means of this calculation model generated according to the invention, the maximum period of use, the wall thicknesses, the materials and/or the maintenance data of the refractory lining 12 or, conversely, the process sequences for the treatment of the molten mass can be optimized. From these analyses, a decision can sometimes be made here regarding further use of the lining with or without repairs. One no longer requires, or if so only to a limited extent, manual experiential interpretation of the period of use of the lining 12 and of the other values to be determined, such as wall thicknesses, material selection etc.

Advantageously, the metallurgical vessel 10, such as for example a converter, is sub-divided into different sections 1 to 10, sections 1, 2, 8 being assigned to the upper vessel part, sections 3, 7, 9 being assigned to the side vessel part, and sections 4, 5, 6 being assigned to the vessel base.

Sections 1 to 10 are evaluated individually or independently of one another with the calculation model. The advantage of this is that the different loads of the lining in the vessel base, the side walls or in the upper vessel part can be correspondingly taken into account.

Before or during generation of the calculation model the data are checked for plausibility after being recorded and if there is a lack or an anomaly of one or more values, the latter are respectively corrected or deleted. After preferably individually checking the data, the latter are stored as an assembled, valid set of data.

Advantageously, a reduced number is selected from the measured or ascertained data or parameters for the recurring calculations or analyses, this taking place dependently upon empirical values or by calculation methods. This selection of measured or ascertained data or parameters for the recurring calculations or analyses takes place by means of algorithms, for example a random feature selection. In this case, the mathematical model is primarily based on and working with algorithms in connection with the associated collected and stored data to the claimed data structure. With such a concretization of this data processing, the mathematical model can be rendered as a tool whose generation and use would be known to those skilled in the art in view of the disclosure herein and their knowledge.

The other data ascertained, but not utilized any further, are used for statistical purposes or for later recording for the reconstruction of production errors or similar.

As another advantage of the invention, the calculation model is adapted from the measurements of the wall thicknesses of the lining 12 after a number of tappings by means of an analysis, for example a regression analysis, by means of which the wear can be calculated or simulated taking into account the collected and structured data. This adapted calculation model is also especially suitable for use for the purposes of testing, in order to test or simulate process sequences or to make specific changes.

The invention is sufficiently displayed by the exemplary embodiment described above. Needless to say, it could also be realized by other variations.

Thus, the vessel 10 is provided on the side, in a way known in its own right, with at least one other outlet opening (not shown in any more detail), with which a special tap with a number of refractory sleeves lined up in a row is generally used. Needless to say, the state of this tap is also measured and ascertained and included in the calculation model according to the invention.

With respect to specific details concerning the model and the manner in which it is generated, a model is a software construct or software architecture that receives input and generates output. As defined by Wikipedia, wherein additional details and links can be found, a mathematical model is a description of a system using mathematical concepts and language. The process of developing a mathematical model is termed mathematical modeling. Mathematical models are used in the natural sciences (such as physics, biology, Earth science, meteorology) and engineering disciplines (such as computer science, artificial intelligence), as well as in the social sciences (such as economics, psychology, sociology, political science). Physicists, engineers, statisticians, operations research analysts, and economists use mathematical models most extensively. A model may help to explain a system and to study the effects of different components, and to make predictions about behavior.

Various inputs are provided to such models. In the invention, these inputs include the state of the refractory lining before use (thickness of blocks of the refractory lining and data about materials injected into the refractory lining), the use conditions (identity of molten metal operatively received by the vessel, properties of the molten metal operatively received by the vessel including amount, temperature and composition of the molten metal operatively received by the vessel, composition of slag in the vessel and thickness of the slag, tapping times using the vessel, temperature profiles of the molten metal operatively received by the vessel, treatment times of the molten metal operatively received by the vessel, metallurgical parameters of the molten metal operatively received by the vessel, and a manner in which the molten metal is poured or tapped into and out of the vessel) and after use state of the refractory lining (thickness of the refractory lining at points of wear). Input into the model is discussed above.

In the invention, the model outputs, knowing the current state of a vessel, a manner for further use of the vessel by considering whether to repair or alter properties of the refractory lining or whether to alter use of the vessel including the refractory lining. When a manner for further use of the refractory lining is determined and is different than the current state or use of the refractory lining, the manner for further use of the refractory lining is implemented. Implementation of the manner for further use of the refractory lining encompasses determining a repair or maintenance schedule for the refractory lining, changing the properties of the refractory lining in other vessels (e.g., thickening the blocks in a specific area if excessive wear is determined to be present at that specific area), changing the conditions of the molten metal being placed into the vessel, and the like.

As discussed above, by means of this calculation model generated according to the invention, characteristics such as the maximum period of use, the wall thicknesses, the materials and/or the maintenance data of the refractory lining 12 or, conversely, the process sequences for the treatment of the molten mass can be optimized. That is, action is taken regarding future use of the vessel or new refractory linings for vessels based on the model's analysis of the current state of the refractory lining of the used vessel(s) and estimated performance based on expected further use.

It is considered common knowledge to one skilled in the art how to use a mathematical model (software construct or software architecture that receives input and generates output), including how to generate a model (but not generation of a model from the specific data as disclosed above or use of such a model). As mentioned above, one skilled in the art recognizes that calculation methods exist for the construction of the refractory lining of metallurgical vessels for molten metal, wherein ascertained data or empirical values are converted into mathematical models. The inventors realized that with these prior art mathematical models, the effective wear mechanisms for uses of the metallurgical vessels cannot be detected sufficiently accurately or be taken into consideration, and hence, the possibilities for mathematically determining the refractory constructions and the maintenance work for the lining are very restricted. To this end, often the decisions regarding the period of use of the refractory lining of a vessel must still be taken manually.

Figure 2:
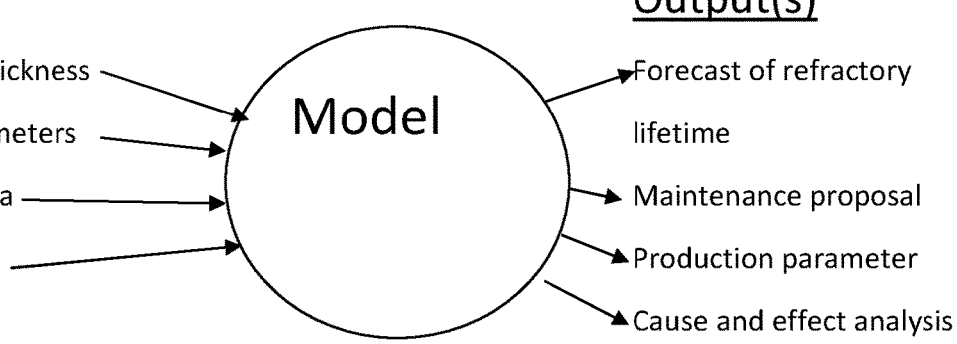
FIG. 2 is a schematic showing a model with its inputs and outputs in accordance with the invention.

An illustrative explanation of the concept of using a model in the claimed invention is provided by FIG. 2. FIG. 2 shows the model in the center, e.g., an artificial intelligence analytics software, receiving input data and generating output. The input data is residual lining thickness of the refractory lining, i.e., the lining thickness during the lifetime determined, for example, by a laser measuring device, production parameters such as refractory wear relevant data of every heated interaction using the vessel, e.g., tapping temperature, power-on time, etc., maintenance data such as gunning data which relates to the injection of materials to repair the refractory lining, e.g., an amount of mix added to the refractory lining, the areas where it is added, as well as other repairs, and properties of the refractory lining such as the lining design and the brick qualities. The output from the model is a forecast of the lifetime of the refractory lining without maintenance, a maintenance proposal which is a schedule of the timing of maintenance to reach the target lifetime of the refractory lining, including when to perform the repairs, what to repair and how to repair, production parameters, i.e., an identification of top wear relevant parameters to possibly adjust the metallurgical process, and a cause and effect analysis which is a holistic understanding of refractory wear mechanism, such as the impact of lance movements on refractory wear.

The actual software that forms the model is readily obtainable or programmable by those skilled in the art to which this invention pertains in view of the disclosure herein and their knowledge of models. For example, U.S. Pat. Nos. 5,890,805 and 5,961,214, incorporated by reference herein, describe a method for monitoring wear of a refractory lining of a blast furnace and for extending the life of the lining by determining the wear line of the lining from signals of temperature probes embedded at spaced locations across the thickness of the refractory using a one dimensional heat transfer model to locate a first approximation of a solidification isotherm of hot metal in the furnace, using the one dimensional heat transfer approximation as an initial boundary in a moving boundary calculation of a two dimensional heat transfer model and iterating the two dimensional model to find a final location of the isotherm by minimizing the difference between the measured and predicted temperatures of the thermoprobes. These patents also mention that it is known to use heat transfer calculations to refractory temperature distributions and then later compare with measured temperatures to estimate remaining refractory and skull thickness, referring to a paper entitled "Evaluation of Mathematical Model for Estimating Refractory Wear and Solidified Layer in the Blast Furnace Hearth", by Suh Young-Keun et al, ISIJ, 1994, pages 223-228.

Also, U.S. Pat. No. 7,174,787, incorporated by reference herein, relates to determining conditions of a refractory lining and mentions that a technique to inspect an industrial furnace makes use of thermal coupling devices in association with numerical modelling techniques to develop a model of the industrial furnace based on known heat transfer characteristics of the refractory material. This model appears to be used to assess the state of the lining to estimate its future functional service life.

Furthermore, other U.S. patent documents describe use of mathematical models, e.g., U.S. Pat. No. 8,002,871 and U.S. Pat. Appln. Publ. No. 20050089468, all of which are incorporated by reference herein.

As for an explanation of use of the model, the model may be used to create new refractory linings of vessels based on data obtained from used vessels. Expected metallurgical, operational and refractory data in the form of a data input (n×m) matrix (the design conditions) is applied to the refractory model (1×m), which describes refractory behavior, to generate an indication of an optimum thickness of the lining of the new refractory lining of a vessel (in matrix format (l×m). The data from the earlier vessels is thus used, via the generation of the refractory model therefrom, to direct construction of new refractory linings of vessels with (expected) optimized performance. Thus, instead of repairing used vessels based on the output from the model, new refractory linings for vessels are formed.

As for additional information, generally, the model is derived from specific information as disclosed above, and used to enable alteration of properties of vessels (repair), direct construction of new refractory lining for vessels, or manage use of the vessels to optimize their service life. As mentioned above, based on known calculation methods or measuring methods, the invention provides a method by means of which the service life of the refractory lining of a metallurgical vessel and the process is optimized and manual decisions for this purpose are reduced or practically eliminated.

In this case, the invention provides for a unique set of data (the first, second and third sets of data) that is used to generate the model and a unique use of the model generated from such data. The core concept of a mathematical model is however well-known in the art and in light of this knowledge, one skilled in the art at the time the invention was made would have easily understood how to make and use the invention since application of a mathematical model in the claimed invention is discussed herein.

The invention claimed is:

1. A method for managing vessels receivable of molten metal, comprising:
    obtaining a first set of data about one of the vessels before operational use of the vessel, the first set of data including thickness of blocks of a refractory lining of the vessel and data about materials injected into the refractory lining;
    obtaining a second set of data about operational use of the vessel, the second set of data including identity of molten metal operatively received by the vessel, properties of the molten metal operatively received by the vessel including amount, temperature and composition of the molten metal operatively received by the vessel, composition of slag in the vessel and thickness of the slag, tapping times using the vessel, temperature profiles of the molten metal operatively received by the vessel, treatment times of the molten metal operatively received by the vessel, metallurgical parameters of the molten metal operatively received by the vessel, and a manner in which the molten metal is poured or tapped into and out of the vessel;
    obtaining a third set of data about the refractory lining after use of the vessel, the third set of data including thickness of the refractory lining at points of wear;
    storing the first, second and third sets of data in a data storage unit;
    evaluating the state of the refractory lining based on at least a portion of data in the first, second and third sets of data which provides information about use of the refractory lining; and
    determining, based on the current state of the refractory lining and the evaluating of the state of the refractory lining, which one of the following changes in the refractory lining or use of the refractory lining is required to optimize a service life of the refractory lining:
        1) repair of the refractory lining, and
            then repairing the refractory lining and using the repaired refractory lining such that the refractory lining has an improved operational state relative to the state of the refractory lining during previous operational use,
        2) altering of existing properties of the refractory lining, and
            then altering properties of the refractory lining and using the refractory lining with the altered properties such that the refractory lining with the altered properties has an improved operational state relative to the state of the refractory lining during previous operational use; and
        3) altering current use of the vessel including the refractory lining, and
            then preparing for altered use of the vessel including the refractory lining which altered use is different from previous use of the vessel including the refractory lining and using the vessel including the refractory lining in an altered manner such that the refractory lining has an improved operational state relative to the state of the refractory lining during previous operational use.

2. The method according to claim 1, further comprising:
    checking the data in the first, second and third sets of data for plausibility before evaluating the state of the refractory lining based on at least the portion of data in the first, second and third sets of data,
    evaluating whether there is a lack or an anomaly of one or more values of the data in the first, second or third sets of data;
    when there is a lack of one or more values of the data in the first, second or third sets of data, correcting the lack of one or more values of the data and
    when there is an anomaly of one or more values of the data in the first, second or third sets of data, deleting the anomaly of one or more values of the data.

3. The method according to claim 2, further comprising, after checking the data in the first, second and third sets of data, storing the checked data in the data storage unit as an assembled, valid set of data.

4. The method according to claim 2, further comprising selecting only a portion of the data in the first, second and third sets of data for use when evaluating the state of the refractory lining dependent upon empirical values or by calculation methods.

5. The method according to claim 2, wherein the vessel is divided into different sections, and wherein the step of evaluating the state of the refractory lining comprises evaluating these sections independently of one another on the basis of all of the data in the first, second and third sets of data.

6. The method according to claim 5, further comprising selecting the sections distributed over a circumference of the vessel and over its height.

7. The method according to claim 1, further comprising selecting only a portion of the data in the first, second and third sets of data for use when evaluating the state of the refractory lining dependent upon empirical values or by calculation methods.

8. The method according to claim 7, wherein the selection of only the portion of the data in the first, second and third sets of data occurs by means of algorithms, one of the algorithms being a random feature selection.

9. The method according to claim 7, further comprising using data other than the data being used to evaluate the state of the refractory lining for statistical purposes or for later recording of data.

10. The method according to claim 1, further comprising measuring the wall thickness of the refractory lining after a number of tappings, the step of evaluating the state of the refractory lining comprising evaluating the state of the refractory lining based on the measured wall thickness of the refractory lining after the number of tappings in addition to the at least the portion of data in the first, second and third sets of data.

11. The method according to claim 10, further comprising testing the refractory lining with altered properties, when it is determined that altering of existing properties of the refractory lining is required and then the properties of the refractory lining are altered, in order to test or simulate process sequences derived from the evaluating of the state of the refractory lining and in order to make specific changes in actual operation.

12. The method according to claim 1, wherein the vessel is divided into different sections, and wherein the step of evaluating the state of the refractory lining comprises evaluating these sections independently of one another on the basis of all of the data in the first, second and third sets of data.

13. The method according to claim 12, further comprising selecting the sections distributed over a circumference of the vessel and over its height.

14. The method according to claim 12, wherein the vessel is a converter.

15. The method according to claim 1, wherein the step of evaluating the state of the refractory lining based on at least a portion of data in the first, second and third sets of data comprises generating a mathematical model that provides an indication of wear of the refractory lining based on the at least the portion of data in the first, second and third sets of data, further comprising:
checking the data in the first, second and third sets of data for plausibility before generating the model from at least the portion of data in the first, second and third sets of data, and only thereafter
storing the checked data in the data storage unit as an assembled, valid set of data.

16. The method according to claim 1, wherein at least a portion of the data in the first, second and third sets of data is obtained by being detected or measured using measuring apparatus, further comprising:
detecting or measuring using the measuring apparatus a fourth set of data about initial construction of the refractory lining, the fourth set of data including identity of materials of the refractory lining, properties of the materials of the refractory lining, and type of installation of the refractory lining in the vessel;
storing the fourth set of data in the data storage unit; and
wherein the step of evaluating the state of the refractory lining comprises evaluating the state of the refractory lining based on a portion of the data in the fourth set of data in addition to the at least the portion of data in the first, second and third sets of data.

17. A method for managing vessels receivable of molten metal and that each have a refractory lining, comprising:
for each of a plurality of the vessels with the same refractory lining,
obtaining a first set of data about the vessel before operational use of the vessel, the first set of data including thickness of blocks of the refractory lining and data about materials injected into the refractory lining;
obtaining a second set of data about operational use of the vessel, the second set of data including identity of molten metal operatively received by the vessel, properties of the molten metal operatively received by the vessel including amount, temperature and composition of the molten metal operatively received by the vessel, composition of slag in the vessel and thickness of the slag, tapping times using the vessel, temperature profiles of the molten metal operatively received by the vessel, treatment times of the molten metal operatively received by the vessel, metallurgical parameters of the molten metal operatively received by the vessel, and a manner in which the molten metal is poured or tapped into and out of the vessel;
obtaining a third set of data about the refractory lining after use of the vessel, the third set of data including thickness of the refractory lining at points of wear;
storing the first, second and third sets of data in a data storage unit;
evaluating the state of the refractory lining based on at least a portion of the data in the first, second and third sets of data for each vessel; and
optimizing use of the vessels in a metallurgical process by determining, based on the evaluating of the state of the refractory lining and the current state of the refractory lining in each vessel, which one of the following is required to optimize a service life of the refractory lining of each vessel:
repair of the refractory lining in that vessel, and then repairing the refractory lining in at least one existing vessel and using the repaired refractory lining;
altering properties of the refractory lining in that vessel, and then altering the properties of the refractory lining in that vessel and using the vessel having the refractory lining with the altered properties; and
altering use of that vessel in the metallurgical process while receiving molten metal, and then preparing for altered use of the vessel including the refractory lining which altered use is different from previous use of the vessel including the refractory lining and using the vessel including the refractory lining in an altered manner.

18. The method according to claim 17, further comprising measuring the wall thickness of the refractory lining of each vessel after a number of tappings, the step of evaluating the state of the refractory lining comprising evaluating the state of the refractory lining based on the measured wall thickness of the refractory lining after the number of tappings of each vessel in addition to the at least the portion of data in the first, second and third sets of data.

19. The method according to claim 17, wherein at least some of the data in the first, second and third sets of data is obtained by being detected or measured using measuring apparatus, further comprising:
detecting or measuring using the measuring apparatus, a fourth set of data about initial construction of the refractory lining of the vessels, the fourth set of data including identity of materials of the refractory lining, properties of the materials of the refractory lining, and type of installation of the refractory lining in the vessel; and
storing the fourth set of data in the data storage unit; and
wherein the step of evaluating the state of the refractory lining based on at least a portion of data in the first, second and third sets of data comprises generating a mathematical model that provides an indication of wear of the refractory lining and indications for change of the refractory lining or future use of the refractory lining to optimize service life of the refractory lining, the mathematical model being generated based on the at least the portion of data in the first, second and third sets of data for each vessel and also a portion of the data in the fourth set of data.

\* \* \* \* \*